(12) United States Patent
Petakov et al.

(10) Patent No.: US 8,200,704 B2
(45) Date of Patent: *Jun. 12, 2012

(54) SEARCHING STRUCTURED DATA

(75) Inventors: Artem Petakov, New York, NY (US);
David Minogue, Palo Alto, CA (US);
Alexey Spiridonov, Boston, MA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/945,600

(22) Filed: Nov. 12, 2010

(65) Prior Publication Data

US 2011/0060749 A1    Mar. 10, 2011

Related U.S. Application Data

(63) Continuation of application No. 11/671,306, filed on Feb. 5, 2007, now Pat. No. 7,836,085.

(51) Int. Cl.
*G06F 7/00* (2006.01)
(52) U.S. Cl. .......... 707/793; 707/796; 707/809
(58) Field of Classification Search .......... None
See application file for complete search history.

(56) References Cited

U.S. PATENT DOCUMENTS

| | | | |
|---|---|---|---|
| 6,366,934 B1 | 4/2002 | Cheng et al. | |
| 6,424,980 B1 | 7/2002 | Iizuka et al. | |
| 6,950,815 B2 | 9/2005 | Tijare et al. | |
| 7,111,000 B2 | 9/2006 | Wen et al. | |
| 2003/0212675 A1 | 11/2003 | Denesuk et al. | |
| 2005/0010494 A1* | 1/2005 | Mourad et al. | 705/26 |
| 2007/0078850 A1* | 4/2007 | Aziz et al. | 707/6 |
| 2007/0203891 A1* | 8/2007 | Solaro et al. | 707/3 |
| 2007/0276845 A1 | 11/2007 | Geilich | |
| 2008/0228675 A1* | 9/2008 | Duffy et al. | 706/10 |

FOREIGN PATENT DOCUMENTS

WO    01/19160    3/2001

OTHER PUBLICATIONS

"Notice of Transmittal of the International Search Report," Jun. 26, 2008.
"Written Opinion of the International Searching Authority," Jun. 26, 2008.
International Preliminary Report on Patentability, International Application No. PCT/US2008/052945, Feb. 4, 2008, 7 pages.
Amento, B., Terveen, L., and Hill, W. "Experiments in Social Data Mining: The TopicShop System," ACM Trans. on Computer-Human Interaction, 2003, pp. 54-85.
U.S. Appl. No. 11/566,083, filed Dec. 1, 2006, "Unified Search Interface," inventor Dustin Boswell.

(Continued)

*Primary Examiner* — Tim T Vo
*Assistant Examiner* — Anh Tai Tran
(74) *Attorney, Agent, or Firm* — Fish & Richardson P.C.

(57) ABSTRACT

Data is identified from one or more data sources, where the data is associated with at least one structured document. Data sets contained within the at least one structured document are extracted, and one or more record items are added to a searchable database, where the one or more record items correspond to the extracted data sets.

36 Claims, 9 Drawing Sheets

OTHER PUBLICATIONS

Butler, Dan, "Quick and Easy Enhancements to Google Earth Using GoogleEarthHacks.com," TNPCnewsletter.com, 2005, [online] Retrieved from the Internet: <URL: http://www.tnpcnewsletter.com/dan/google-earth/>, [retrieved on Mar. 31, 2009], 7 pages.

Card, S. K., Roberston, G. G., and York, W.,"The WebBook and the Web Forager: An Information Workspace for theWorld-WideWeb," Proc. of SIGCHI, 1996, pp. 111-117.

Dontcheva, M., Druker, S. M., Salesin, D., and Cohen, M. F., "Relations, Cards, and Search Templates: User-Guided Web Data Integration and Layout," ACM Symposium on User Interface Software and Technology, Oct. 7-10, 2007, pp. 61-70.

Dontcheva, M., Drucker, S. M., Wade, G., Salesin, D, and Cohen, M. F., "Summarizing PersonalWeb browsing Sessions," Proc. of UIST, 2006, pp. 115-124.

"Google Earth Blog—The amazing things about Google Earth198," Aug. 23, 2005 [online]. Retrieved from the Internet: <URL: http://www.gearthblog.com/blog/archives/2005/08/keyhole_communi.html>, [retrieved on Mar. 31, 2009], 4 pages.

Halevy, A. Y., Rajaraman, A., and Ordille, J. J., "Data Integration: The Teenage Years," Proc. of VLDB, 2006, pp. 9-16.

Hogue, A., and Karger, D., "Thresher: Automating the Unwrapping of Semantic Content From the World Wide Web," Proc. of WWW, 2005, pp. 86-95.

Huynh, D., Mazzocchi, S., and Karger, D., "Piggy Bank: Experience the Semantic Web Inside Your Web Browser," Proc. of ISWC, 2005, pp. 413-430.

Irmak, U., and Suel, T., "Interactive Wrapper Generation With Minimal User Effort," Proc. of WWW, 2006, pp. 553-563.

Keyhole 2 Fusion Version 2.3 manual, Keyhole, Inc., 2005, 195 pages.

Kristjansson, T., Culotta, A., Viola, P., and McCallum, A., "Interactive Information Extraction With Constrained Conditional Random Fields," Proc. of AAAI, 2004, pp. 412-418.

Madhavan, J., Jeffery, S. R., Cohen, S., Dong, X. L., Ko, D., Yu, C., and Halevy, A., "Web-Scale Data Integration: You Can Afford to Pay As You Go," Proc. of CIDR, 2007, pp. 342-350.

"Placemarks and Overlays (Basic Training)—Google Earth Community," Dec. 30, 2004[online] Retrieved from the Internet: <URL: http://bbs.keyhole.com/ubb/ubbthreads.php?ubb=showflat&Number=22811>, [retrieved on Mar. 31, 2009], 12 pages.

Robertson, G. Czerwinski, M. Larson, K. Robbins, D. C. Thiel, D. and van Dantzich, M. "Data Mountain: Using Spatial Memory for Document Management," Proc. of UIST, 1998, pp. 153-162.

Schraefel, M. C., Zhu, Y., Modjeska, D., Wigdor, D., and Zhao, S., "Hunter Gatherer: Interaction Support for the Creation and Management of Within-Web-Page Collections," Proc. of WWW, 2002, pp. 172-181.

Sherman, Chris, "Google's Local Search Goes Beta," ClickZ.com [online], Mar. 24, 2004. Retrieved from the Internet: <URL: http://www.clickz.com/3329201>, [retrieved on Mar. 31, 2009], 1 page.

Sherman, Chris, "Yahoo Bolsters Local Search Business Listings," SearchEngineWatch.com [online], Dec. 8, 2004. Retrieved from the Internet: <URL: http://searchenginewatch.com/3444861>, [retrieved on Mar. 31, 2009], 2 pages.

Sugiura, A., and Koseki, Y., "Internet Scrapbook: Automating Web Browsing Tasks by Demonstration," Proc. of UIST, 1998, pp. 9-18.

Terdiman, Daniel, "Google Gets Earthy," Wired.com, Jun. 30, 2005, [online]. Retrieved from the Internet: <URL: http://www.wired.com/science/discoveries/news/2005/06/68042>, [retrieved on Mar. 31, 2009], 2 pages.

Viola, P., and Narasimhan, M., "Learning to Extract Information From Semi-Structured Text Using a Discriminative Context Free Grammar," Proc. of SIGIR, 2005, pp. 330-337.

Viola, P., and Narasimhan, M., "Learning to Extract Information From Semi-Structured Text Using a Discriminative Context Free Grammar," Proc. of SIGIR, 2003, pp. 330-337.

Ye, S., Chua, T.-S., Kei, J. R., "Querying and Clustering Web Pages about Persons and Organizations," Proceedings of the IEEE/WIC International Conference on Web Intelligence (WI'03), 2003.

English translation of Chinese Office Action for Chinese Patent Application No. 200880010447.X, dated Jul. 29, 2011, 9 pages.

* cited by examiner

```
<?xml version="1.0" encoding="UTF-8"?>
<kml xmlns="http://earth.google.com/kml/2.1">
    <Placemark>
        <name>Simple placemark</name>
        <description> Google's Mountain View Office.</description>
        <Point>
            <coordinates>-122.0822035425683, 37.4222899014 0251, 0</coordinates>
        </Point>
    </Placemark>
</kml>
```

FIG. 4

| URL | Contents | MetaData |
|---|---|---|
| http://bbs.keyhole.com/samples/GoogleOffices.kml | `<?xml version="1.0" encoding="UTF-8"?>`<br>`<kml xmlns="http://earth.google.com/kml/2.1">`<br>`<Document>`<br>`<name>GoogleOffices.kml</name>`<br>`<Folder>`<br>`<name>Google Offices Around The World</name>`<br>`<Placemark>`<br>`<name>Headquarters in Mountain View</name>`<br>`<Point>`<br>`<coordinates>-122.0840843892076, 37.4219827720 0917, 0</coordinates>`<br>`</Point>`<br>`</Placemark>`<br>`<Placemark>`<br>`<name>New York City Office</name>`<br>`<Point>`<br>`<coordinates>-74.0046470406 7973, 40.7419598869 7928, 0</coordinates>`<br>`</Point>`<br>`</Placemark>`<br>`<Placemark>`<br>`<name>Tokyo Office</name>`<br>`<description>Located in Cerulean Tower near Shibuya Station.</description>`<br>`<Point>`<br>`<coordinates>139.699540 9987466, 35.6563848540 7928, 0</coordinates>`<br>`</Point>`<br>`</Placemark>`<br>`</Folder>`<br>`</Document>`<br>`</kml>` | Page Rank = 100<br><br>Downloads = 5<br><br>Anchors = {http://bbs.keyhole.com/samples/Samples.html, "Google Offices"} |

FIG. 6

| Document ID | Name | Geometry | Description | Anchor Text | Source URL | Parent URL | Prominence |
|---|---|---|---|---|---|---|---|
| 0x43522 268 | Head- quarters in Mountain View | \<Point\> \<coordinates\> -122.0840843892076, 37.4219827720091 7, 0 \</coordinates\> \</Point\> | Google Offices Around The World; Head- quarters in Mountain View | Google Offices | http://bbs.keyhole. com/samples/ GoogleOffices.kml | http://bbs.keyhole. com/samples/ Samples.html | 34 |
| 0x93451 14 | New York City Office | \<Point\> \<coordinates\> -74.004647040679 73, 40.7419598869792 8, 0 \</coordinates\> \</Point\> | Google Offices Around The World; New York City Office | Google Offices | http://bbs.keyhole. com/samples/ GoogleOffices.kml | http://bbs.keyhole. com/samples/ Samples.html | 34 |
| 0x14320 091 | Tokyo Office | \<Point\> \<coordinates\> 139.6995409987466, 35.656384854079 28, 0 \</coordinates\> \</Point\> | Google Offices Around The World; Tokyo Office; Located in Cerulean Tower near Shibuya Station | Google Offices | http://bbs.keyhole. com/samples/ GoogleOffices.kml | http://bbs.keyhole. com/samples/ Samples.html | 34 |

FIG. 8

SEARCHING STRUCTURED DATA

CROSS REFERENCE TO RELATED APPLICATION

This application is a continuation application of, and claims priority to, pending U.S. patent application Ser. No. 11/671,306, filed on Feb. 5, 2007, entitled "Searching Structured Geographical Data". The disclosure of the foregoing application is incorporated herein by reference in its entirety.

FIELD

This disclosure relates to providing results to user searches.

BACKGROUND

Query processing systems are commonly used to locate information from large data collections. Exemplary systems include those that identify relevant web pages responsive to one or more user search terms entered by a user seeking to identify relevant web content. In a web page search system, search results can be identified by matching the terms in the search query to a corpus of pre-stored web pages.

Data collections can also include structured documents that can include a potentially large amount of data, of which a small subset is pertinent to particular search. An exemplary structured document is a Keyhole Markup Language (KML) document, which is an XML-based file format used to display geographic data in a browser, such as 'Google Earth'. A KML document utilizes a tag-based structure with nested elements and attributes, and can be used to associate descriptive text, models, and images with locations on the earth's surface.

Although web page search systems are adept at identifying documents which, as a whole, match the individual terms of a query, they are incapable of identifying the elements of structured documents which, in context, match the parameters of a query. As an illustrative example, search systems may not return only most relevant data stored within a KML document. Therefore, users are unable to search structured documents based on their content, such as nested elements and attributes. For instance, a user is unable to search for elements of KML files by specifying a geographic area of interest, by filtering KML files based on keywords, or by specifying a combination of such search queries.

SUMMARY

The following disclosure describes systems, methods, and computer program products that permit the identification of search query results.

According to an aspect, there is disclosed a method. The method includes identifying data from one or more data sources, where the data is associated with at least one structured document, and extracting one or more data sets contained within the at least one structured document. The method further includes adding one or more record items to a searchable database, where the one or more record items correspond to the one or more extracted data sets.

According to an aspect, the method can include retrieving the data from the one or more data sources. Further, at least one of the one or more data sources can include one or more uniform resource locators (URLs). According to an aspect, the data is at least one structured document. The data can also include metadata, such as a page rank. According to yet another aspect, the method can include identifying metadata associated with the data subsequent to identifying the data from the one or more data sources.

According to still another aspect, the method can include generating an output file, where the output file includes data associated with two or more structured documents. Extracting one or more data sets can also include extracting one or more data sets from the output file. Additionally, according to an aspect, the at least one structured document can include two or more structured documents, and the method can further include merging the two or more structured documents.

According to another aspect, the at least one structured document comprises a Keyhole Markup Language (KML) document. Additionally, the one or more data sets can include at least one placemark. The method can also include receiving at least one search query, and identifying at least one of the one or more record items responsive to receiving the at least one search query. Further, extracting one or more data sets contained within the at least one structured document can include associating the one or more data sets with contextual information associated with the at least one structured document.

These general and specific aspects may be implemented using a system, a method, or a computer program, or any combination of systems, methods, and computer programs.

BRIEF DESCRIPTION OF THE DRAWINGS

FIG. 4 shows an illustrative KML file.

FIG. 6 shows an illustrative sample output file that includes a single file indexed by URL.

FIG. 8 shows an illustrative sample output file including multiple record items corresponding to a single URL.

DETAILED DESCRIPTION

Figure 1:
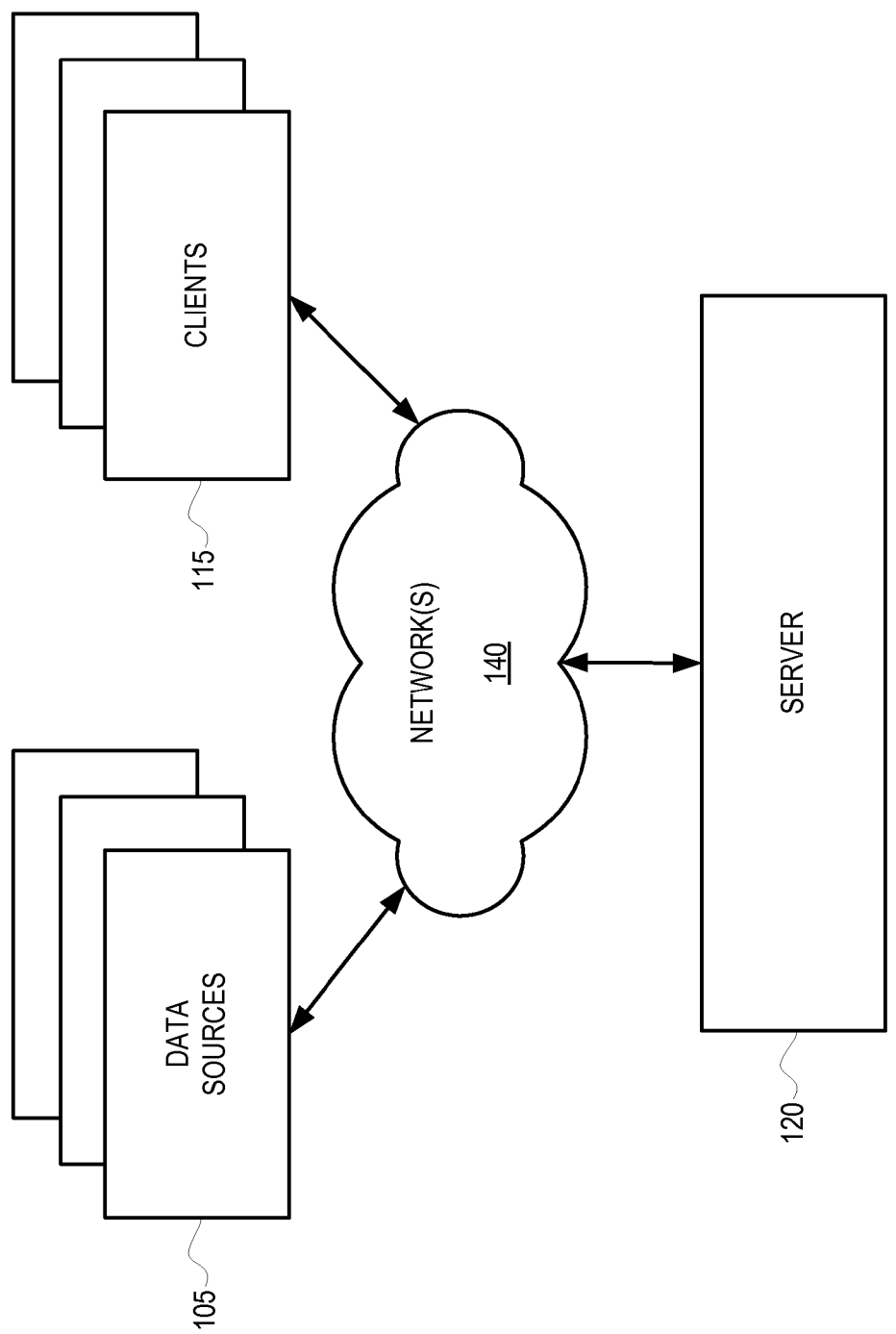
FIG. 1 shows a search system, according to an illustrative implementation.

The present disclosure now will be described more fully hereinafter with reference to the accompanying drawings, in which some, but not all implementations are shown. Indeed, these implementations can be embodied in many different forms and should not be construed as limited to the implementations set forth herein; rather, these implementations are provided so that this disclosure will satisfy applicable legal requirements. Like numbers refer to like elements throughout.

The present disclosure describes a search system that permits the collection of structured documents and the extraction of data sets within such structured documents such that the individual data sets may be searched and retrieved in response to a user search query. For instance, a KML file having several placemarks may be extracted such that the individual placemarks are searchable records that may be returned as search results to a user query. The extraction of data sets from within a structured document is performed such that contextual information associated with the structured document is maintained subsequent to extraction.

This disclosure is described with reference to block diagrams and flowchart illustrations of methods, apparatuses (i.e., systems) and computer program products. It will be understood that blocks of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function(s) specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the function(s) specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Referring now to FIG. 1, a search system 100 is shown according to an illustrative implementation. The system 100 includes one or more clients 115 in communication with a server 120 via one or more networks 140. Although multiple clients 115 and a single server 120 are illustrated in FIG. 1, there can be more servers and more or fewer clients. For instance, some of the functions performed by the server 120 can be performed by one or more other servers such that the server 120 can represent several devices, such as a network of computer processors and/or servers. Additionally, in some implementations a client can perform a function of the server 120 and the server 120 can perform a function of a client. The clients 115 can include a device, such as a personal computer, a wireless telephone, a personal digital assistant (PDA), a laptop computer, or another type of computation or communication device, a thread or process running on one of these devices, and/or an object executable by one of these devices.

The system 100 also includes one or more data sources 105 in communication with the server 120 via one or more networks 140. In the system 100 the server 120 can collect and/or receive data from one or more data sources 105 and manipulate the data to generate a response to a search query received from one or more clients 115.

The network(s) 140 can include one or more local area networks (LANs), wide area networks (WANs), telephone networks, such as the Public Switched Telephone Network (PSTN), intranets, the Internet, and/or or other type of network. The clients 115, data sources 105, and server 120 can connect to the network(s) 140 via wired, wireless, or optical or other connections. In alternative implementations, one or more of the devices illustrated in FIG. 1 are directly connected to another one of the devices. For example, in one implementation, the clients 115 and/or data sources 105 are directly connected to the server 120.

Figure 2:
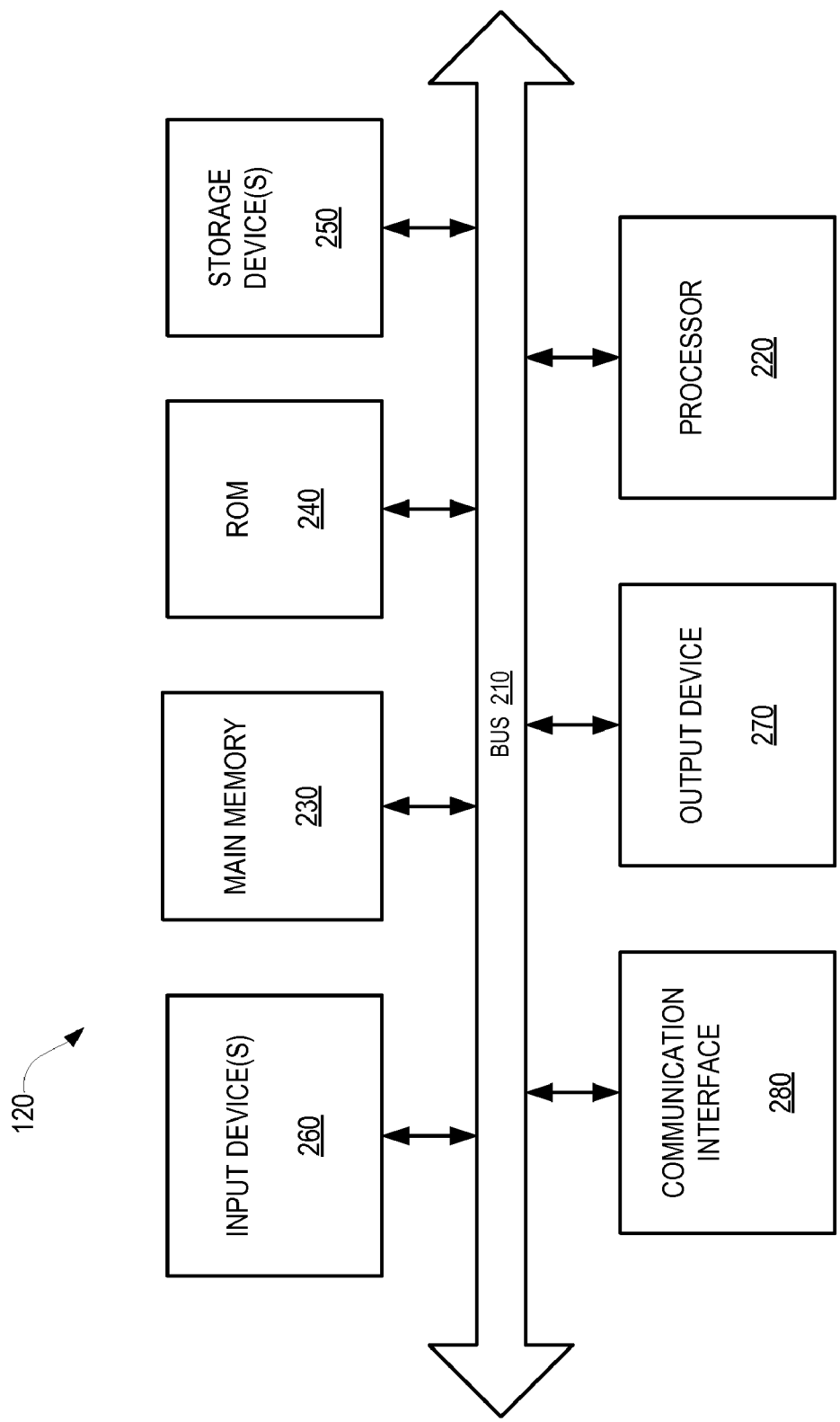
FIG. 2 shows a components of a server within the search system of FIG. 1, according to an illustrative implementation.

FIG. 2 shows the server 120 of FIG. 1, according to an illustrative implementation. The server 120 can include a bus 210, a processor 220, a main memory 230, a read only memory (ROM) 240, a storage device 250, one or more input devices 260, one or more output devices 270, and a communication interface 280. The bus 210 can include one or more paths that permit communication among the components of server 120.

The processor 220 includes any type of conventional processor, microprocessor or processing logic that interprets and executes instructions. The main memory 230 can include a random access memory (RAM) or another type of dynamic storage device that stores information and instructions for execution by processor 220. The ROM 240 can include a conventional ROM device or another type of static storage device that stores static information and instructions for use by the processor 220, including, for instance, an operating system. Additionally, the storage device 250 can include a magnetic and/or optical recording medium and its corresponding drive.

The server 120 can also include an input device 260 having one or more conventional mechanisms that permit a user to input information to the server 120, such as a keyboard, a mouse, a pen, voice recognition and/or biometric mechanisms, or the like. The output device 270 includes one or more conventional mechanisms that output information to the user, such as a display, a printer, a speaker, or the like. The communication interface 280 can include any transceiver-like mechanism that enables the server 120 to communicate with other devices and/or systems. For example, the communication interface 280 can include mechanisms for communicating with another device or system via one or more networks, such as the network(s) 140.

In operation the server 120 can store collect documents and data associated with documents from one or more data sources 105, manipulate such documents and data, and can identify results responsive to client search queries. In one implementation, the server 120 performs these operations in response to the processor 220 executing software instructions contained in a computer-readable medium, such as memory 230. The software instructions can be read into the memory 230 from another computer readable medium, such as a data storage device 250, or from another device via the communication interface 280. The software instructions contained in the memory 230 cause processor 220 to perform processes described in this patent disclosure. Alternatively, hardwired circuitry can be used in place of or in combination with software instructions to implement processes consistent with the disclosure. Thus, implementations are not limited to any specific combination of hardware circuitry and software.

Figure 3:
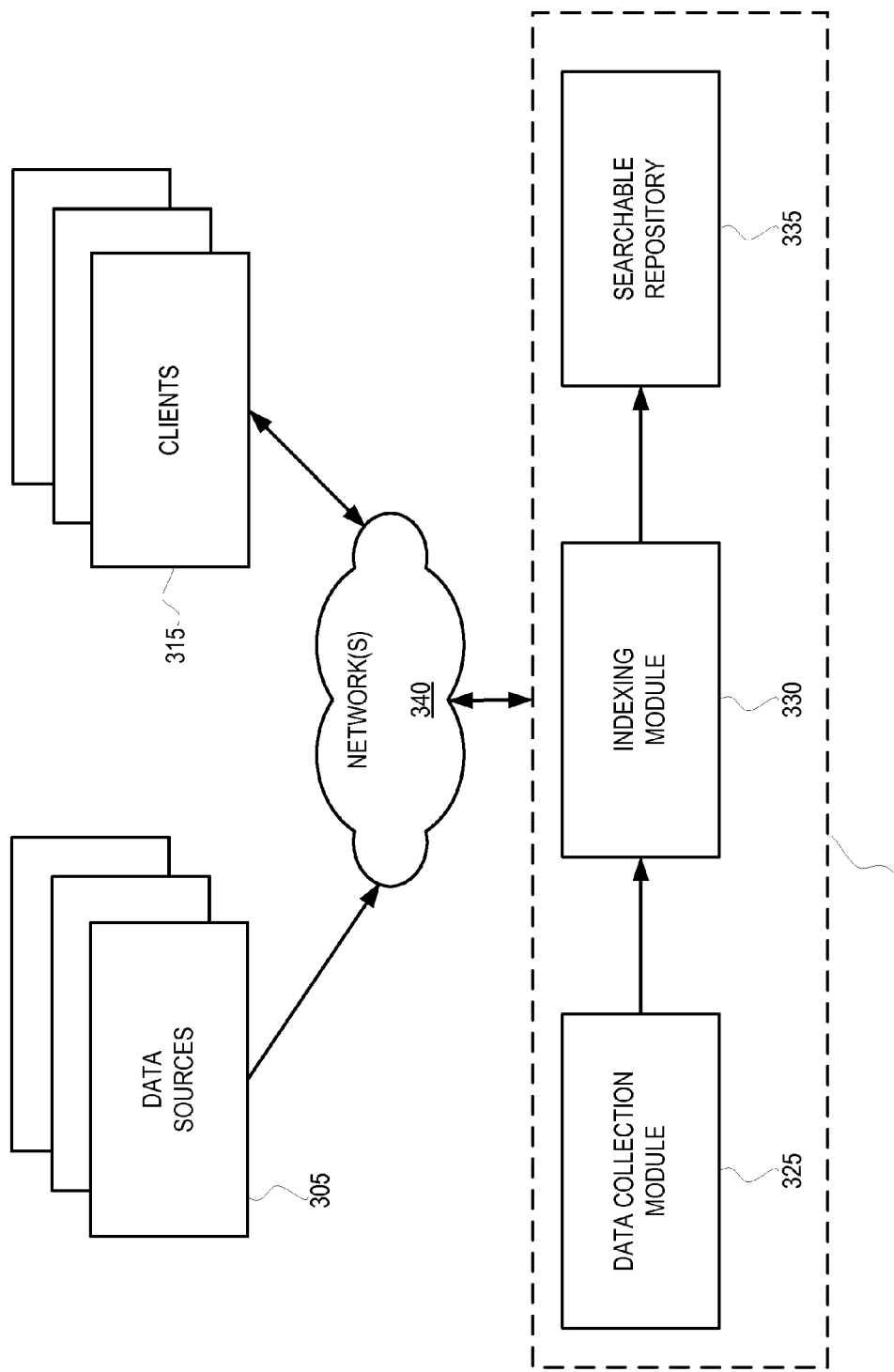
FIG. 3 shows a search system, according to an illustrative implementation.

Referring now to FIG. 3, a search system 300 is shown according to an illustrative implementation. The search system 300 is similar to the system 100 shown in FIG. 1, and includes one or more data sources 305 and one or more clients 315 in communication with a server 320 via one or more networks 340. Like the system 100 of FIG. 1, the data sources 305 and/or clients 315 may be geographically dispersed and/or or local to the server 320, and can communicate with the server 320 directly in alternative to communicating via the one or more networks 340. Further, the one or more data sources 305 and/or one or more clients 315 can be local to the server 320.

The one or more data sources 305 can include one or more data repositories, web pages, and the like, that include documents and metadata associated with the documents. According to an implementation, the documents can include structured documents, such as KML files. A KML file is an XML-based data or file format used to display geographic data in a browser, such as 'Google Earth', 'Google Maps', and 'Google Maps for mobile', and utilizes a tag-based structure with nested elements and attributes.

KML files can be used to associate descriptive text, models, and images with locations on the earth's surface. Within a KML file, each georeferenced entity is called a placemark, which can be georeferenced to points, areas, or paths. An illustrative KML file 400 that identifies a simple placemark is shown in FIG. 4. The KML file 400 generally includes an XML header, which is the first line in the KML file 400, a KML namespace definition, which is the second line in the KML file 400, and at least one placemark object that includes several elements including a name, a description, and a point. The name can be used as the label for the placemark, the description can appear in a graphical 'balloon' attached to the placemark in a browser, and the point can specify the position of the placemark, such as in terms of longitude, latitude, and/or altitude, a street address, or the like. A KML file can contain multiple placemarks, and the placemarks within a KML file may be organized in a hierarchy of enclosing folders. A KML file can also include other descriptive features, and can include descriptive HTML to add links, font sizes, styles, colors, identify text alignment, and the like.

Referring again to FIG. 3, structured documents and metadata from the one or more data sources 305 are received by the server 320. The one or more data sources 305 can include public and/or private repositories of data. According to an implementation, documents and metadata are collected by the data collection module 325 as a result of data being pulled from the data sources 305 by the data collection module 325. Data sources may alternatively or additionally push, or transmit, documents and metadata to the data collection module 325, either automatically and/or upon a request by the data collection module 325 for data. For instance, KML files and their associated metadata may be received by the data collection module 325. The metadata associated with a KML file can include, among other data, a page rank that identifies, relative to an arbitrary numbering scheme, the relative rank of the file identifying the number of links (or popularity) of the file, the number of downloads of the file, and/or other metadata. Metadata associated with a document can come from a different source than the document itself, such as from a separate document or database.

Although the present disclosure will be described in detail hereinafter with reference to KML files and their associated metadata, the present disclosure is operative with any structured data format that may be used to link data, such as location names, descriptive text, images, geographic references, and the like. For instance, the one or more data sources 305 can also transmit GeoRSS files to the server 320, where GeoRSS files contain HTML and typically reference a geographic location. Still other files, such as KMZ files, may be utilized.

After the collection of structured documents and related metadata is complete, the data collection module 325 merges the structured documents and metadata and provides an indexed output file to an indexing module 330. The indexing module 330 is operable to parse the indexed output file received from the data collection module 325 to identify one or more data sets, calculate a query independent rank for extracted data sets, and forward record items corresponding to the extracted data sets for storage in a results repository 335 used to respond to user queries. According to an exemplary implementation, KML documents and metadata generated by the data collection module 325 can be fed as an input into the indexing module 330, which can parse the KML files, extract placemarks, calculate a query independent rank for each placemark, and provide each placemark individually for insertion into a search repository 335 used to respond to user search queries.

Although each of the data collection module 325, indexing module 330, and results repository 335 are illustrated as internal to the server 320, and may be implemented by software instructions stored within a memory 230, or other components of the illustrative server 120 shown in FIG. 2, one or more the data collection module 325, indexing module 330, and/or results repository 335 may reside external to the server 320. For instance, one or more of the components 325, 330, 335 may reside in one or more separate servers. The components 325, 330, 335 can also be combined in whole or part in one or more components. Therefore, the block diagram implementation of the illustrative system 300 shown in FIG. 3 is intended to represent various functions of the system 300 without limitation to specific software and/or hardware that can implement the functions described herein.

Figure 5:
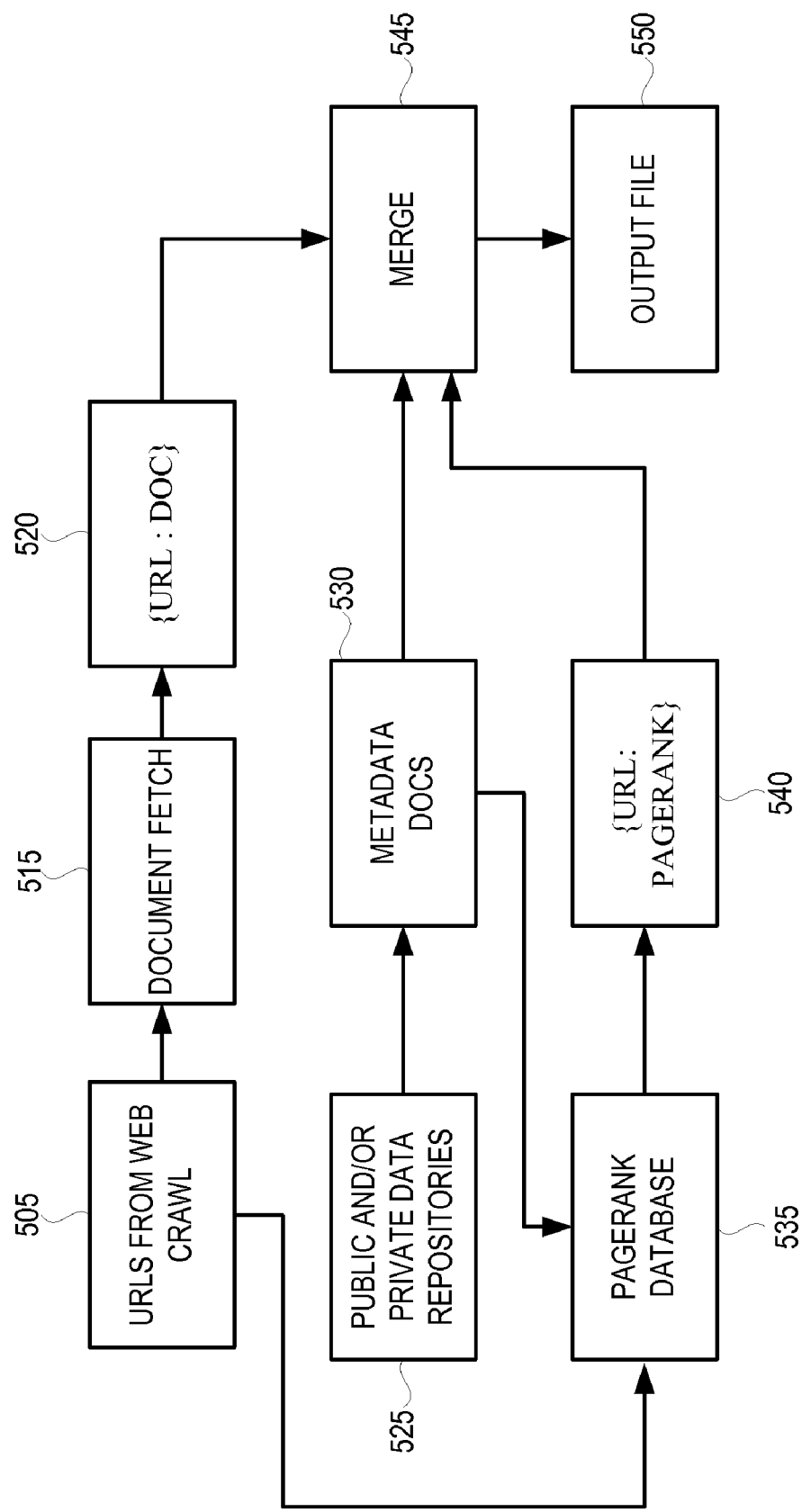
FIG. 5 shows exemplary processes for collecting and merging documents and metadata from one or more data sources, according to an implementation.

Next, FIG. 5 shows an exemplary functional block diagram flow chart 500 illustrating the collection of documents and metadata from one or more data sources by the data collection module 325. According to an implementation, the data collection module 325 is operable to identify and retrieve structured documents and any metadata associated with such documents, for instance, KML documents and associated metadata.

According to an implementation, the data collection module 325 can utilize a web crawl program to identify structured documents existing on the world wide web ('web'). A web crawl program browses the web, creating a copy of visited pages, and creates an index or table of URLs it encounters. As shown in FIG. 5, the web crawl program is operable to generate URLs 505 associated with, or identifying, the individual pages identified by the web crawl program. The URLs can identify structured documents and/or metadata associated with structured documents.

According to an implementation, during the web crawl structured files may be examined and/or converted into a separate file format to enable the contents of the structured files to be examined and/or searched. For example, a structured KML file can have an HTML file associated with it (and identified by a URL) that describes the contents of the KML file, where the HTML file may be relevant for ranking and/or indexing the KML file. As shown in FIG. 5, URLs included within the metadata, including URLS for each structured document, are forwarded to a page rank database 535, which may include additional metadata associated with each structured document.

The data collection module 325 can examine the URLs 505 and identify all structured documents of interest, such as all KML documents. Once the entries are identified the data collection module 325 executes a document fetch 515 to retrieve the structured documents 520 associated with the identified URLs. Additional structured documents and meta data 530 can be collected from other public and/or private data repositories 525. Each data source may include different metadata 530 associated with a particular structured file, such as the number of times the file was downloaded from a particular site, user feedback, or the like. URLs for each structured document collected from other public and/or private data repositories 525 are forwarded to a page rank database 535, which may include additional metadata associated with each structured document.

As described above, upon identifying a structured document, the data collection module 325 can attempt to lookup a page rank of each discovered structured file. According to an implementation, the data collection module queries a page rank database 535 for identified documents by attempting to fetch a page rank of the URLs corresponding to each structured document discovered in the web crawl or public and/or private data repositories. The page rank may be used by the search system to prioritize results to user queries. According to another implementation, the page rank of URLs is not fetched for identified documents. Still, other metadata may be looked up for a corresponding URL, for instance, from one or more other databases.

Metadata keyed by URL 540 and collected from the page rank database 535 is merged 545 with the structured documents and metadata identified from the web crawl and/or public or private data repositories. This data can be passed through one or more de-duplication stages to eliminate duplicate documents. As an illustrative example, two identical files, each downloaded from a respective different URL, may be identified. One of the two identical files may be deleted by a duplication elimination (or de-duplication) stage. As another illustrative example, a URL associated with a particular page rank may be merged with the same URL associated with a document. Merging of metadata and documents may occur by URL and/or merging on the raw document contents.

According to an implementation, the data collection module 325 can convert all discovered structured documents and metadata into a common format to generate an output file 550. According to an implementation, the output of the data collection module 325 is a single indexed output file 550 in which each record contains a structured document and all of the associated metadata to be used to score the record to identify whether it is an appropriate response to a user search query. The output file can include a table of records indexed by URL, where all of the information associated with each URL is in a record associated with the URL.

FIG. 6 shows a sample output file 600 generated from collection of documents and metadata from one or more data sources by the data collection module 325. As illustrated, the output file includes a record associated with a source URL identifying a KML file associated with "Google Offices". The contents include several placemarks corresponding to different Google offices around the world, including names and coordinates for "headquarters in Mountain View", "New York City", and "Tokyo Office". Metadata associated with the source URL identifies the page rank of the URL, and the number of downloads of the file, for instance, provided by the web site from which it was available. The metadata can also include an anchor, such as a URL, that is associated with each placemark. Although only one source URL is shown in the sample output file 600, the single output file 550 can include two or more records.

The output file 550 generated by the data collection module 325 is transmitted to the indexing module 330. The indexing module 330 is operable to extract data sets from the records within the output file while preserving contextual information. For instance, the indexing module 330 is operable to extract placemarks from a single KML file that may include a large number of placemarks, where the extraction preserves contextual text, such as parent folders, referring pages, and the like. As an example, a KML file that includes several placemarks, each associated with a particular hotel within the city of London (which may be a parent folder within which the hotels are identified), may be extracted such that each placemark becomes an individual searchable item associated with the city of London.

Figure 7:
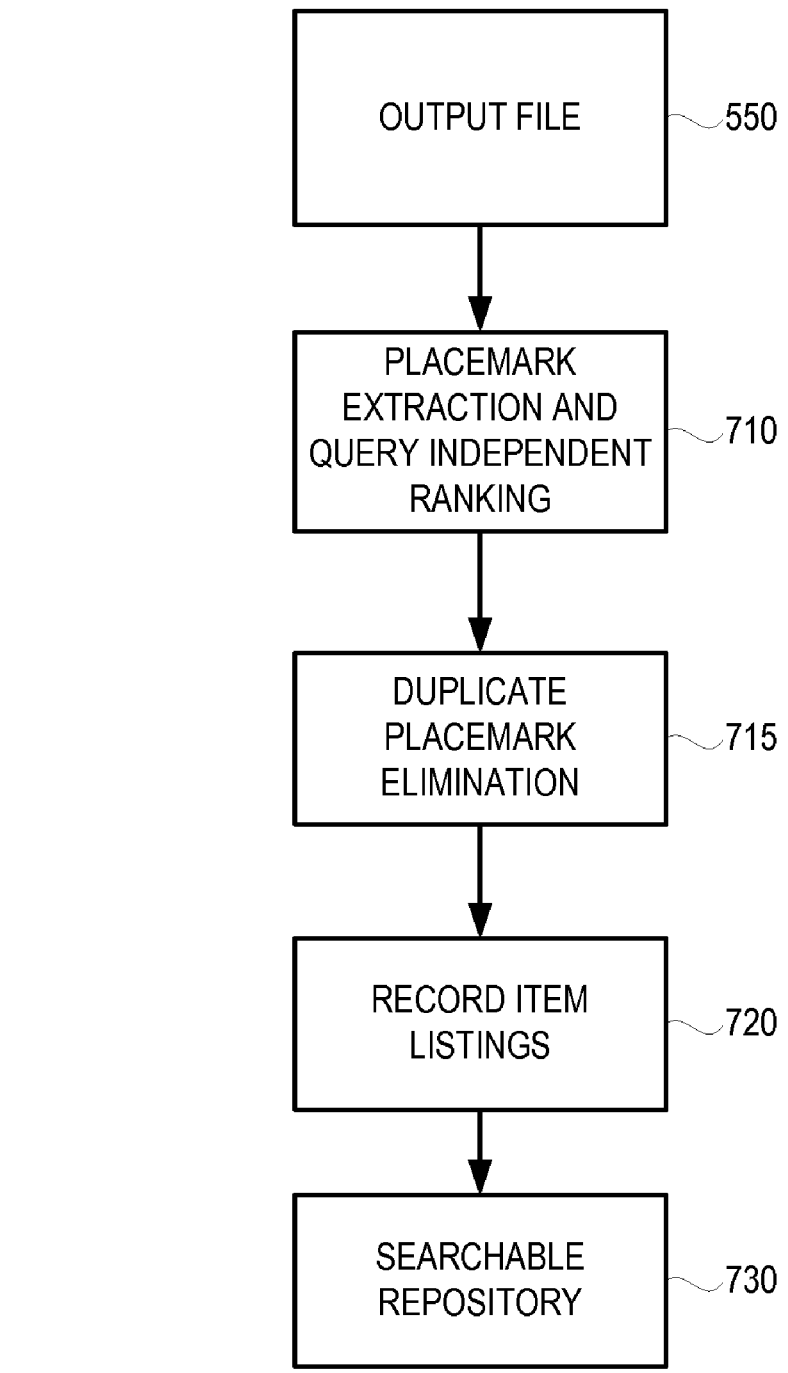
FIG. 7 shows and exemplary process flow for extraction of structured files, according to an implementation.

FIG. 7 shows an exemplary process flow 700 implemented by the indexing module 300 to perform indexing. Whereas the output file 550 generated by the data collection module 325 includes records indexed by URL, the indexing module 330 can transform each record indexed by URL into multiple records items per URL. According to an implementation, indexing of structured documents can be implemented by taking the output file 550, parsing the structured records to extract individual data sets (e.g., placemarks) (block 710), calculating a query independent rank for each data set, and transmitting record items corresponding to the data sets to a searchable repository 335. Although the present disclosure is referenced herein with respect to placemarks within KML files, other data sets within structured documents may be extracted by the indexing module 330.

According to an implementation, the indexing module 330 transforms a record indexed by URL into multiple records items per URL, where each record item is indexed by a document ID, which is an number chosen by the indexing module 330 to uniquely identify a record item, such as a placemark. According to an implementation, the document ID can be generated as a hash value from selected fields of a record. For instance, the document ID may be based in part on geo coordinates identifying the location of a placemark.

During extraction, the indexing module 330 associates the contextual information from the original record with each data set. For instance, each placemark extracted from a KML file will preserve its context information, including the URL and other metadata of the corresponding structured file and the name of each enclosing folder, in addition to the placemark's descriptive text and other data, such as georeference data. Additionally, for each placemark the indexing module 330 can calculate a query independent score based on the available metadata. This may utilize one or more rankings from other databases (not illustrated).

The indexing module 330 is further operable to eliminate duplicate record items (block 715) based on like metadata. For instance, duplicate placemarks may be eliminated based on comparison of the fingerprint of the location and placemark name. The placemark with the highest score based on the available metadata may be retained.

The indexing module 330 is optionally operable to cluster data sets within structured documents into a compound search result where the data sets are related. For instance, subsequent to extracting data sets from one or more records indexed by URLs, one or more data sets may be combined, or clustered, into a single compound search result where they refer to the same physical entity. This may be useful to improve the diversity of results. For instance, a user search query with the terms 'statue' for New York City may would return placemarks having the highest score, which may all be placemarks identifying the Statue of Liberty. Clustering all results for the Statue of Liberty will permit a search result that provides one compound result for the Statue of Liberty such that other statue results can also be provided to a user.

If all items associated with a certain entity are clustered, however, this can reduce the ability to identify a particular record entry. Therefore, a serving module can perform dynamic clustering that is based at least in part on the user's search query. For instance, continuing with the Statue of Liberty example, a search for 'Statue of Liberty' and 'Tours' may result in clustering based on a user search term in addition to static terms included within records indexed by URLs.

The record items identified by the indexing module 330 are listed individually and provided to the searchable repository for use in responding to user queries (blocks 720, 730). An illustrative example of an indexing module 330 output 800 that corresponds to the illustrative output file 600 of FIG. 6 is shown in FIG. 8. The placemarks identified in FIG. 6 as existing within a single record entry have been extracted into separate record items 805, 810, 815. This permits a user to search for content associated with individual record items extracted from a structured document.

Figure 9:
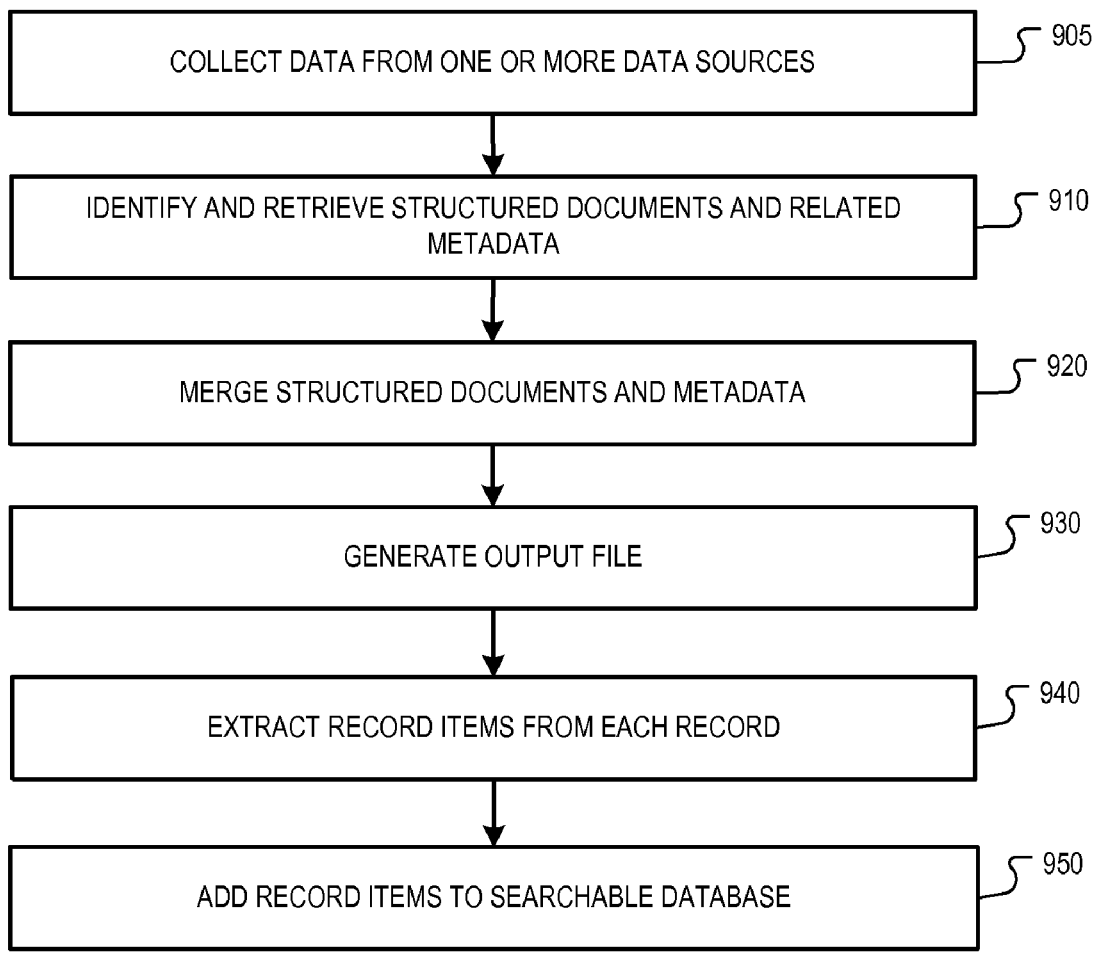
FIG. 9 shows a process of structured document collection and extraction, according to an implementation.

FIG. 9 shows a process of structured document collection and extraction, according to an implementation. Data is collected from one or more data sources (block 905), where the data can include one or more structured documents and metadata associated therewith. According to an implementation, the data collection can be effected by the data collection module 325, which can collect data from the one or more data sources 305. From the collected data, structured documents and associated metadata is identified (block 910). Next, structured documents and metadata associated therewith may be merged, for instance, by URL. Duplicate entries may also be merged based on other keys, such as based on the document contents (block 920). An output file is then generated (block 930). According to an implementation, the identification of structured data, the merging of structured documents and metadata, and/or the generation of an output file can also be performed by the data collection module 325.

Record items are then created from each record indexed within the output file by extracting data sets from each output file record. For instance, where the output file record includes a KML file indexed by URL, record items can be created that correspond to extracted placemarks within the KML file (block 940). According to an implementation, the extraction of data sets and generation of record items can be performed by the indexing module 330. After extraction is complete, the record items (or table of record items) are added to a searchable database (block 950).

Many modifications and other implementations will come to mind to one skilled in the art having the benefit of the teachings presented in the foregoing descriptions and the associated drawings. Therefore, it is to be understood that the disclosure is not limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A computer-implemented method, comprising:
   identifying, in a computer, a plurality of structured documents having a same structured data format;
   parsing each structured document in the plurality of structured documents and extracting a plurality of data sets from each structured document;
   obtaining distinct metadata from a plurality of sources for each structured document in the plurality of structured documents, wherein the distinct metadata for each structured document comprises a rank of the structured document, a popularity of the structured document, or a number of downloads of the structured document, and wherein one or more sources in the plurality of sources comprises a different source than the structured document itself;
   merging the distinct metadata from the plurality of sources, including removing duplicate metadata;
   associating the distinct metadata for each respective structured document with each data set extracted from the respective structured document;
   adding a plurality of record items to a searchable database, wherein each record item corresponds to one of the extracted data sets, and wherein each record item is associated with the distinct metadata associated with the corresponding data set;
   receiving a search query;
   using the distinct metadata associated with each of one or more of the record items to calculate a query-independent score for at least one record item in the searchable database and using the query-independent score to identify the at least one record item as a response to the search query; and
   returning the identified at least one record item in response to the search query.

2. The method of claim 1, further comprising:
   crawling the web to identify the structured documents and generate an output file including a plurality of records, each record including data from one of the structured documents;
   wherein parsing the structured documents and extracting the plurality of data sets comprises parsing the records in the output file and extracting the plurality of data sets from each record.

3. The method of claim 1, wherein the structured documents comprise documents containing location names, descriptive text, and geographic references.

4. The method of claim 1, further comprising calculating a query independent score for a data set using a respective ranking retrieved from each of one or more databases.

5. The method of claim 1, wherein the distinct metadata for each structured document comprises a rank of the structured document.

6. The method of claim 1, wherein the distinct metadata for each structured document comprises a popularity of the structured document.

7. The method of claim 1, wherein the distinct metadata for each structured document comprises a number of downloads of the structured document.

8. The method of claim 1, further comprising associating contextual information for each structured document with each of the plurality of data sets extracted from the structured document, wherein the contextual information includes an identifier for the structured document, an anchor associated with the structured document, and the name of an enclosing folder for the structured document.

9. The method of claim 3, wherein the structured documents are GeoRSS files or KMZ files.

10. A system, comprising: one or more computers programmed to perform operations comprising:
    identifying, in a computer, a plurality of structured documents having a same structured data format;
    parsing each structured document in the plurality of structured documents and extracting a plurality of data sets from each structured document;
    obtaining distinct metadata from a plurality of sources for each structured document in the plurality of structured documents, wherein the distinct metadata for each structured document comprises a rank of the structured document, a popularity of the structured document, or a number of downloads of the structured document, and wherein one or more sources in the plurality of sources comprises a different source than the structured document itself;

merging the distinct metadata from the plurality of sources, including removing duplicate metadata;

associating the distinct metadata for each respective structured document with each data set extracted from the respective structured document;

adding a plurality of record items to a searchable database, wherein each record item corresponds to one of the extracted data sets, and wherein each record item is associated with the distinct metadata associated with the corresponding data set;

receiving a search query;

using the distinct metadata associated with each of one or more of the record items to calculate a query-independent score for at least one record item in the searchable database and using the query-independent score to identify the at least one record item as a response to the search query; and returning the identified at least one record item in response to the search query.

11. The system of claim 10, further programmed to perform operations comprising:

crawling the web to identify the structured documents and generate an output file including a plurality of records, each record including data from one of the structured documents;

wherein parsing the structured documents and extracting the plurality of data sets comprises parsing the records in the output file and extracting the plurality of data sets from each record.

12. The system of claim 10, wherein the structured documents comprise documents containing location names, descriptive text, and geographic references.

13. The system of claim 10, further programmed to perform operations comprising calculating a query independent score for a data set using a respective ranking retrieved from each of one or more databases.

14. The system of claim 10, wherein the distinct metadata for each structured document comprises a rank of the structured document.

15. The system of claim 10, wherein the distinct metadata for each structured document comprises a popularity of the structured document.

16. The system of claim 10, wherein the distinct metadata for each structured document comprises a number of downloads of the structured document.

17. The system of claim 10, further programmed to perform operations comprising associating contextual information for each structured document with each of the plurality of data sets extracted from the structured document, wherein the contextual information includes an identifier for the structured document, an anchor associated with the structured document, and the name of an enclosing folder for the structured document.

18. The system of claim 12, wherein the structured documents are GeoRSS files or KMZ files.

19. A computer-implemented method, comprising:

identifying a plurality of structured documents and distinct metadata for each structured document, the structured documents having a same structured data format, wherein the structured documents are received from one or more data sources and the distinct metadata for each structured document is received from one or more data sources different from the one or more data sources from which the structured document was received;

wherein the same structured data format is a format for geographic data, wherein the plurality of structured documents contain location names, descriptive text, and geographic references;

parsing each structured document in the plurality of structured documents and extracting a plurality of data sets from each structured document;

merging the distinct metadata from the one or more data sources, including removing duplicate distinct metadata;

associating the distinct metadata for each structured document with each data set extracted from the structured document;

adding a plurality of record items to a searchable database, wherein a structure of the record items corresponds to the same structured data format of the structured documents, wherein each record item corresponds to one of the extracted data sets, and wherein each record item is associated with the distinct metadata associated with the corresponding data set;

receiving a search query;

using the distinct metadata associated with each of one or more of the record items to identify at least one record item in the searchable database; and returning the identified at least one record item in response to the search query.

20. The method of claim 19, wherein the distinct metadata for a structured document comprises a page rank, wherein the page rank identifies the rank of the structured document relative to other documents.

21. The method of claim 19, further comprising:

crawling the web to identify the structured documents and generate an output file including a plurality of records, each record including data from one of the structured documents;

wherein parsing the structured documents and extracting the plurality of data sets comprises parsing the records in the output file and extracting the plurality of data sets from each record.

22. The method of claim 19, further comprising associating contextual information for each structured document with each of the plurality of data sets extracted from the structured document, wherein the contextual information includes an identifier for the structured document, an anchor associated with the structured document, and the name of an enclosing folder for the structured document.

23. The method of claim 19, further comprising calculating a query independent score for each data set from the metadata associated with the structured document from which the data set was extracted.

24. The method of claim 19, further comprising calculating a query independent score for a data set using a respective ranking retrieved from each of one or more databases.

25. The method of claim 19, wherein the distinct metadata for each structured document comprises a rank of the structured document.

26. The method of claim 19, wherein the distinct metadata for each structured document comprises a popularity of the structured document.

27. The method of claim 19, wherein the distinct metadata for each structured document comprises a number of downloads of the structured document.

28. A system, comprising: one or more computers programmed to perform operations comprising:

identifying a plurality of structured documents and distinct metadata for each structured document, the structured documents having a same structured data format, wherein the structured documents are received from one or more data sources and the distinct metadata for each structured document is received from one or more data sources different from the one or more data sources from which the structured document was received;

wherein the same structured data format is a format for geographic data, wherein the plurality of structured documents contain location names, descriptive text, and geographic references;

parsing each structured document in the plurality of structured documents and extracting a plurality of data sets from each structured document;

merging the distinct metadata from the one or more data sources, including removing duplicate distinct metadata;

associating the distinct metadata for each structured document with each data set extracted from the structured document;

adding a plurality of record items to a searchable database, wherein a structure of the record items corresponds to the same structured data format of the structured documents, wherein each record item corresponds to one of the extracted data sets, and wherein each record item is associated with the distinct metadata associated with the corresponding data set;

receiving a search query;

using the distinct metadata associated with each of one or more of the record items to identify at least one record item in the searchable database; and returning the identified at least one record item in response to the search query.

29. The system of claim 28, wherein the distinct metadata for a structured document comprises a page rank, wherein the page rank identifies the rank of the structured document relative to other documents.

30. The system of claim 28, further programmed to perform operations comprising:

crawling the web to identify the structured documents and generate an output file including a plurality of records, each record including data from one of the structured documents;

wherein parsing the structured documents and extracting the plurality of data sets comprises parsing the records in the output file and extracting the plurality of data sets from each record.

31. The system of claim 28, further operable to associate contextual information for each structured document with each of the plurality of data sets extracted from the structured document, wherein the contextual information includes an identifier for the structured document, an anchor associated with the structured document, and the name of an enclosing folder for the structured document.

32. The system of claim 28, further programmed to perform operations comprising calculating a query independent score for each data set from the metadata associated with the structured document from which the data set was extracted.

33. The system of claim 28, further programmed to perform operations comprising calculating a query independent score for a data set using a respective ranking retrieved from each of one or more databases.

34. The system of claim 28, wherein the distinct metadata for each structured document comprises a rank of the structured document.

35. The system of claim 28, wherein the distinct metadata for each structured document comprises a popularity of the structured document.

36. The system of claim 28, wherein the distinct metadata for each structured document comprises a number of downloads of the structured document.

\* \* \* \* \*